US011199710B2

(12) United States Patent
Wheelwright et al.

(10) Patent No.: US 11,199,710 B2
(45) Date of Patent: Dec. 14, 2021

(54) LOW-OBLIQUITY BEAM SCANNER WITH REFLECTIVE POLARIZER

(71) Applicant: Facebook Technologies, LLC, Menlo Park, CA (US)

(72) Inventors: Brian Wheelwright, Sammamish, WA (US); Weichuan Gao, Redmond, WA (US); Stephen James McNally, Sammamish, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 280 days.

(21) Appl. No.: 16/562,878

(22) Filed: Sep. 6, 2019

(65) Prior Publication Data

US 2021/0072542 A1    Mar. 11, 2021

(51) Int. Cl.
*G02B 26/08* (2006.01)
*G02B 27/01* (2006.01)
*G02B 17/02* (2006.01)
*G02B 26/10* (2006.01)
*G02B 27/28* (2006.01)

(52) U.S. Cl.
CPC ....... *G02B 27/0172* (2013.01); *G02B 17/023* (2013.01); *G02B 26/101* (2013.01); *G02B 27/286* (2013.01); *G02B 2027/0118* (2013.01); *G02B 2027/0123* (2013.01); *G02B 2027/0147* (2013.01); *G02B 2027/0178* (2013.01)

(58) Field of Classification Search
CPC .............. G02B 27/0172; G02B 17/023; G02B 26/101; G02B 27/286; G02B 2027/0118; G02B 2027/0123; G02B 2027/0147; G02B 2027/0178; G02B 26/10; G02B 2027/015; G02B 27/283
USPC ....................................... 359/207.9
See application file for complete search history.

(56) References Cited

U.S. PATENT DOCUMENTS 8,355,013 B2    1/2013   Sprague et al.
2013/0003022 A1 1/2013   Tanaka et al.
(Continued)

OTHER PUBLICATIONS

PCT/US2020/046578 Search Report dated Nov. 13, 2020.

*Primary Examiner* — Euncha P Cherry
(74) *Attorney, Agent, or Firm* — Pequignot + Myers; Matthew A. Pequignot

(57) ABSTRACT

A beam scanner of a projector-based near-eye display includes a prismatic element with a reflective polarizer and a quarter-wave waveplate (QWP). The beam-folding prismatic element receives a polarized light beam from a light source and couples the beam to a tiltable reflector, e.g. a 2D tiltable MEMS reflector, for angular scanning the beam. The light beam impinging onto the tiltable reflector is separated from the light beam reflected from the tiltable reflector by polarization. The polarization-based separation is achieved by causing the light beam to propagate through the QWP before and after impinging onto the tiltable reflector. Upon double propagation of the light beam through the QWP, the beam changes its polarization to an orthogonal polarization, which enables its separation from the impinging beam. The beam scanner may receive multiple light beams from multiple light sources. A projector and a near-eye display based on such beam scanners are also disclosed.

14 Claims, 13 Drawing Sheets

(56) References Cited

U.S. PATENT DOCUMENTS

2015/0277056 A1* 10/2015 Colbourne ............... G02B 6/34
                                                         385/17
2018/0120559 A1* 5/2018 Yeoh .................... G02B 5/3083

* cited by examiner

LOW-OBLIQUITY BEAM SCANNER WITH REFLECTIVE POLARIZER

TECHNICAL FIELD

The present disclosure relates to wearable headsets, and in particular to components and modules for wearable visual display headsets.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

Projector-based displays provide images in angular domain, which can be observed by a user directly, without an intermediate screen or a display panel. A waveguide may be used to carry the image in angular domain to the user's eye. The lack of a screen or high numerical aperture collimating optics in a scanning projector display enables size and weight reduction of the display. A scanner for a projector display needs to be fast, have a wide scanning range, and preserve the optical quality of the beam being scanned to form an image in angular domain.

SUMMARY

In accordance with the present disclosure, there is provided a beam scanner comprising a beam-folding prismatic element comprising first and second adjacent surfaces and a first reflective polarizer at the first surface. The beam-folding prismatic element is configured to reflect an impinging first light beam at least twice from within the beam-folding prismatic element, including one reflection from the first reflective polarizer, before redirecting the first light beam out of the beam-folding prismatic element through the second surface. A quarter-wave waveplate (QWP) is configured for receiving and propagating therethrough the first light beam exiting the beam-folding prismatic element. A tiltable reflector is configured to receive the first light beam and reflect the first light beam at a variable angle back towards the QWP. In operation, the first light beam propagated through the QWP after reflection from the tiltable reflector propagates through the beam-folding prismatic element. The first and second surfaces of the beam-folding prismatic element may form am angle therebetween of less than 45 degrees.

In some embodiments, the impinging first light beam has a first polarization state, and the first reflective polarizer is configured to reflect light having the first polarization state and to transmit light having a second polarization state, whereby the first light beam propagated twice through the QWP exits the beam-folding prismatic element through the first reflective polarizer. The beam-folding prismatic element may be configured to reflect the first light beam at the second surface by total internal reflection. The QWP may extend substantially parallel to the second surface of the beam-folding prismatic element and may be separated from the beam-folding prismatic element by an air gap. The tiltable reflector may include a microelectromechanical system (MEMS) tiltable reflector, which may be tiltable about one axis or two axes.

In some embodiments, a second prismatic element is provided for propagating therethrough the first light beam outputted by the beam-folding prismatic element, the second prismatic element adjoining the first reflective polarizer. The second prismatic element may include a beam dump adjoining one of surfaces of the second prismatic element. The first surface of the beam-folding prismatic element may be curved for collimating the first light beam reflected from the first surface. The second prismatic element may also include a curved surface matching the curved surface of the beam-folding prismatic element, and the first reflective polarizer may be sandwiched between the beam-folding prismatic element and the second prismatic element.

In some embodiments, the beam-folding prismatic element further includes a second reflective polarizer disposed within the beam-folding prismatic element in an optical path of the first light beam between reflections from the second and first surfaces within the beam-folding prismatic element, and the QWP is optically coupled to a third surface of the beam-folding prismatic element. In operation, the first light beam undergoes a first reflection from the second surface, propagates through the second reflective polarizer, undergoes a second reflection from the third surface through the QWP, is reflected by the first reflective polarizer, exits the beam-folding prismatic element at its third surface through the QWP, is reflected by the tiltable reflector to propagate back through the QWP, thorough the second reflective polarizer, and out of the beam-folding prismatic element. A second prismatic element may be coupled to the first surface of the beam-folding prismatic element, for receiving a second light beam impinging on the second prismatic element, and for coupling the second light beam to the beam-folding prismatic element through the first reflective polarizer. The beam-folding prismatic element may further include: a fourth surface and a third reflective polarizer at the fourth surface, wherein the third reflective polarizer adjoins the first and second reflective polarizers; a fifth surface and a fourth reflective polarizer at the fifth surface, wherein the fourth reflective polarizer adjoins the first and second reflective polarizers; a third prismatic element coupled to the fourth surface of the beam-folding prismatic element, for receiving a third light beam impinging on the third prismatic element, and for coupling the third light beam to the beam-folding prismatic element through the third reflective polarizer; and a fourth prismatic element coupled to the fifth surface of the beam-folding prismatic element, for receiving a fourth light beam impinging on the fourth prismatic element, and for coupling the fourth light beam to the beam-folding prismatic element through the fourth reflective polarizer. The first, the second, the third, and the fourth reflective polarizers may form a symmetric pyramidal structure having a common apex, four sides, and a common rectangular base.

In accordance with the present disclosure, there is provided a projector including at least one light source for providing a first light beam to a beam scanner described above.

In accordance with the present disclosure, there is further provided a near-eye display including a projector described above, and a controller operably coupled to the first light source and the tiltable reflector and configured to: operate the tiltable reflector to cause the first light beam reflected from the tiltable reflector and propagated through the beam-folding prismatic element to have a beam angle corresponding to a first pixel of an image to be displayed; and operate the first light source in coordination with operating the tiltable reflector, such that the first light beam has brightness and/or color corresponding to the first pixel. In embodiments where the projector of the near-eye display includes a plurality of light sources, e.g. the first light source for providing the first light beam and the second light source for providing the second light beam, the controller may be configured to operate the tiltable reflector to cause the first and second light beams reflected from the tiltable reflector and propagated through the beam-folding prismatic element to have a beam angle corresponding to first and second pixels, respectively, of the image to be displayed, and operate the first and second light sources in coordination with operating the tiltable reflector, such that the first and second light beams have brightness and/or color corresponding to the first and second pixels, respectively.

BRIEF DESCRIPTION OF THE DRAWINGS

Exemplary embodiments will now be described in conjunction with the drawings, in which.

DETAILED DESCRIPTION

Figure 1:
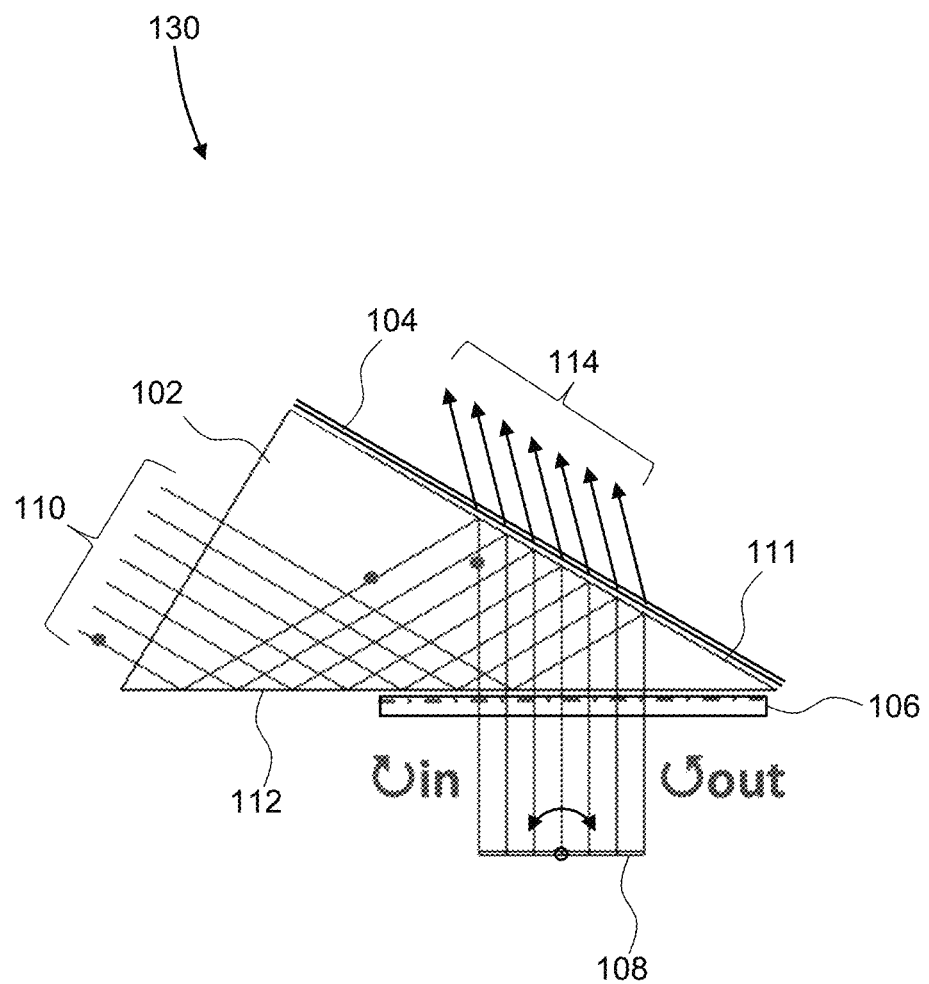
FIG. 1 is a side cross-sectional view of a beam scanner of this disclosure including a beam-folding prismatic element.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIG. 1 and FIGS. 3 to 8, similar reference numerals denote similar elements.

A tiltable reflector may be used to scan a light beam emitted by a light source to form an image in angular domain for direct observation by a user of a near-eye display. As the light beam is scanned, the brightness and/or color of the scanned light beam may be varied in coordination with the scanning, in accordance with corresponding pixels of the image being displayed. The entire image is formed when the light beam is scanned in two dimensions, e.g. over X- and Y-viewing angles, over the entire frame or field of view (FOV) of the user. When the frame rate is high enough, the eye integrates the scanned light beam, enabling the user to see the displayed imagery substantially without flicker.

One problem associated with near-eye display image scanners is reduction of field of view (FOV) caused by an oblique angle of incidence of the light beam onto a tiltable reflector of the scanner. The oblique angle may be required by the optical geometry used, e.g. to physically separate an impinging light beam from the scanned, i.e. reflected, light beam. The FOV reduction is caused by distortion of the solid angle representing the range of scanning at oblique angles of incidence of light beam at the tiltable reflector.

In accordance with the present disclosure, the output (scanned) light beam may be spatially separated from the input optical beam by polarization. This obviates the need in geometrical separation of the beams by oblique angles of incidence, resulting in a compact configuration providing a nearly straight angle of incidence at the tiltable reflector when the latter is in a center (non-tilted) angular position. Low obliquity of the impinging light beam enables the scanning range to be utilized more efficiently.

Several embodiments of the beam scanner of this disclosure will now be considered. Referring to FIG. 1, a beam scanner 130 includes a beam-folding prismatic element 102 having first 111 and second 112 adjacent surfaces, and a reflective polarizer (RP) 104 disposed at the first surface 111. A quarter-wave waveplate (QWP) 106 is disposed at the second surface 112 of the beam-folding prismatic element 102. A tiltable reflector 108 is disposed next to the QWP 106.

In operation, a collimated light beam 110, provided by an image light source (not shown), impinges onto the beam-folding prismatic element 102. The impinging light beam 110 is linearly polarized perpendicular to the plane of FIG. 1 in this example, although it may be polarized differently depending on optical configuration. The light beam 110 propagating in the beam-folding prismatic element 102 is reflected by the second surface 112 towards the first surface 111. The reflective polarizer 104 is configured to reflect light linearly polarized perpendicular to the plane of FIG. 1, and to transmit light polarized in the plane of FIG. 1. Thus, the reflective polarizer 104 reflects the light beam 110 to propagate back to the first surface 111, albeit at a different angle of incidence than the angle of first incidence of the light beam 110 onto the second surface 112. Thus, the beam-folding prismatic element 102 is configured to reflect the impinging light beam 110 at least twice from within the beam-folding prismatic element 102, including one reflection from the reflective polarizer 104, before redirecting the light beam 110 out of the beam-folding prismatic element 102 through its second surface 112.

The QWP 106 receives and propagates through the light beam 110 exiting the beam-folding prismatic element 102. Upon propagating through the QWP 106, the light beam 106 becomes circularly polarized, e.g. right-circular polarized in this example. The tiltable reflector 108 receives the light beam 110 and reflect the light beam 110 back towards the QWP 106. The angle at which the tiltable reflector 108 reflects the light beam 110 may be varied (scanned) by tilting the tiltable reflector 108.

The reflected light beam 110 becomes left-circular polarized. This is because the direction of propagation of the reflected light beam 110 changes, while the phase relationship between x- and y-component of the light field of the light beam 110 impinging onto the tiltable reflector 108 remains substantially the same. Since the handedness of the circular polarization is determined with the account of direction of propagation, the handedness of the reflected light beam 110 changes as well. The light beam 110 propagates again through the QWP after reflection from the tiltable reflector 108 and becomes polarized in plane of FIG. 1. This causes the light beam 110 propagating through the beam-folding prismatic element 102 (upwards in FIG. 1) to further propagate through the reflective polarizer 104 forming an output light beam 114. More generally, the impinging light beam 110 may have a first polarization state, and the reflective polarizer 104 is configured to reflect light having the first polarization state and to transmit light having a second polarization state, whereby the light beam 110 propagated twice through the QWP 106 exits the beam-folding prismatic element 102 through the reflective polarizer 104. The angle of the output light beam 114 depends on the angle of tilt of the tiltable reflector 108. It is to be understood that the tiltable reflector 108 may be tiltable in two axes, i.e. both in plane of FIG. 1 and perpendicular to that plane.

The beam-folding prismatic element 102 may be made of an optically clear material such as glass, plastic, etc. The first 111 and second 112 surfaces may form an angle of less than 45 degrees, e.g. 30 degrees or less, for a more compact configuration. In some embodiments, the beam-folding prismatic element 102 is configured to reflect the light beam 110 at the second surface 112 by total internal reflection (TIR). To that end, the beam-folding prismatic element 102 may have a high enough refractive index such that the angle of incidence of the light beam 110 onto the second surface 112 from within the beam-folding prismatic element 102 is larger than a TIR critical angle determined by the refractive index. To facilitate the TIR of the light beam 110 from the second surface 112, the QWP 106 may be separated from the second surface 112 of the beam-folding prismatic element 102 by a thin air gap. The QWP 106 may extend substantially parallel to the second surface 112 of the beam-folding prismatic element 102. In some embodiments, the QWP 106 is laminated onto the second surface 112.

The QWP 106 may be made of a material with suitable birefringence, e.g. a birefringent polymer sheet or a rigid crystalline material, such as crystalline quartz, for example. The QWP 106 may be a zero-order QWP and/or may include a stack of thin crystalline materials or a stack of birefringent polymer sheets with optical axes at non-zero angles to each other. The tiltable reflector 108 may be e.g. a microelectromechanical system (MEMS) tiltable reflector or mirror, which may be tiltable about one axis (1D MEMS) or two axes (2D MEMS) by applying voltage to its electrodes.

It is to be understood that the impinging light beam 110 may be collimated, nearly-collimated, diverging, or converging, and may include a plurality of sub-beams provided by independently controllable emitters of a light source. The sub-beams would typically propagate at small angles with respect to each other, e.g. within a cone of 2 degrees, or even a narrower cone e.g. 1 degree or 0.5 degree.

Figure 2A:
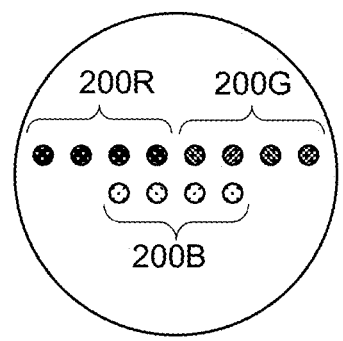
FIGS. 2A, 2B, and 2C are frontal views of multi-emitter light sources usable with the beam scanner of FIG. 1.
Figure 2B:
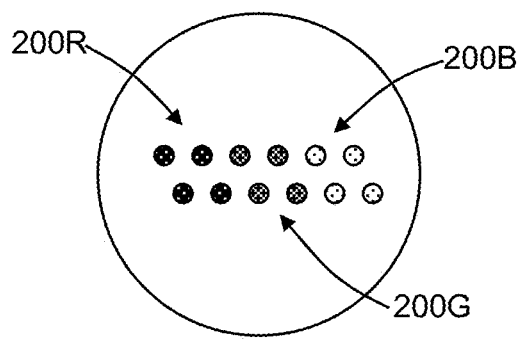
Figure 2C:
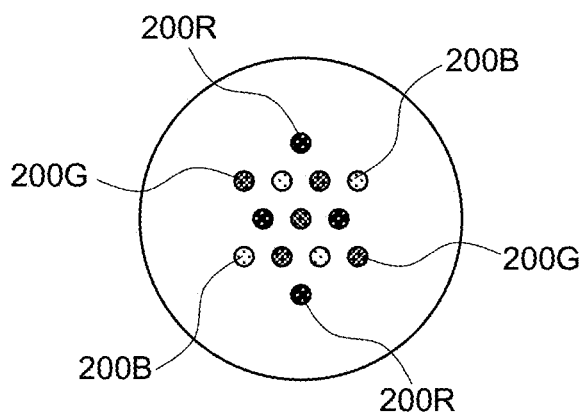

Referring to FIGS. 2A, 2B, and 2C, a light source may include a plurality of individual emitters. Several emitters may be provided for each color channel. For example, four red emitters 200R may be provided for red (R) color channel (dark-shaded circles); four green emitters 200G may be provided for green (G) color channel (medium-shaded circles); and four blue emitters 200B may be provided for blue (B) color channel (light-shaded circles). The emitters 200R, 200G, and 200B may be disposed in a line pattern (FIG. 1A); in a zigzag pattern (FIG. 1B); or in a honeycomb pattern (FIG. 2C), to name just a few examples. Having a plurality of emitters illuminating a same tiltable reflector enables one to scan light beams generated by these emitters together as a group. Multiple emitters and, in some cases, multiple light sources may be used to provide redundancy in case some of light sources fail, increase image resolution, increase overall image brightness, etc.

Figure 3:
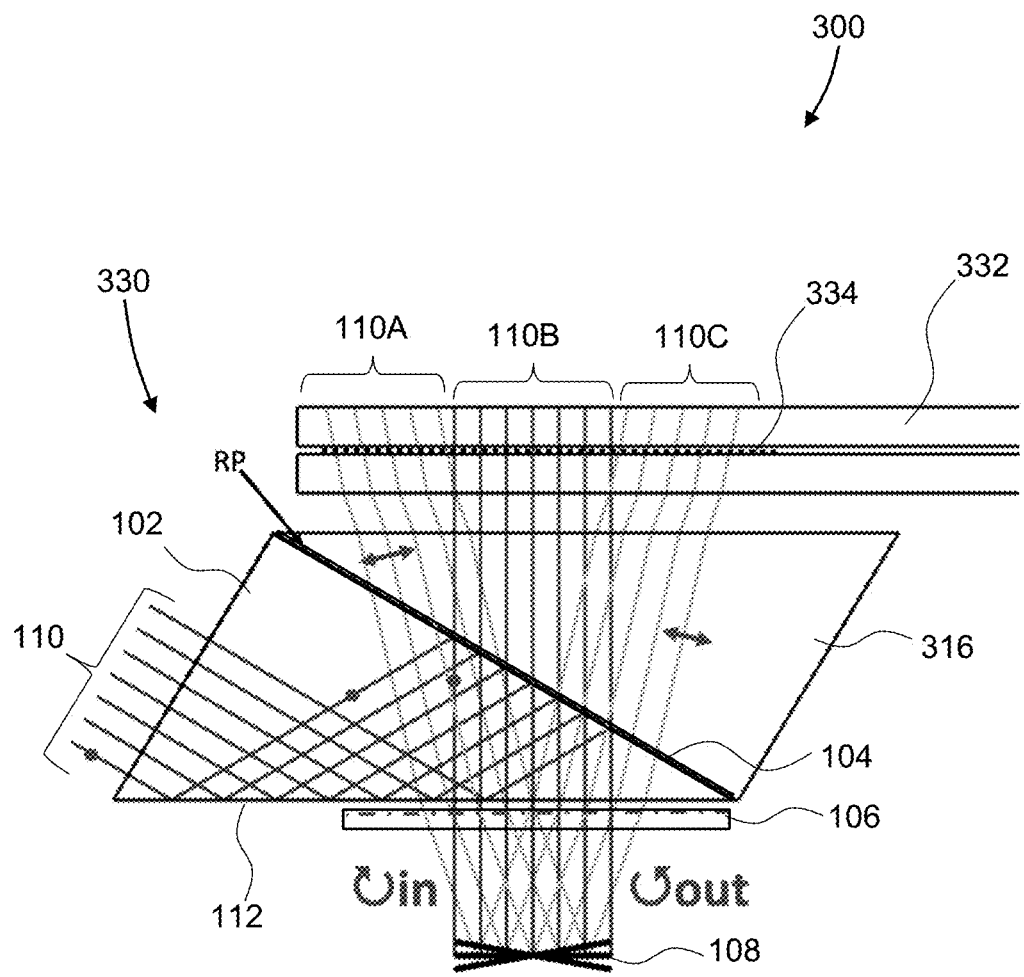
FIG. 3 is a side cross-sectional view of a near-eye display (NED) including a beam scanner of FIG. 1 equipped with a second prismatic element matching the beam-folding prismatic element.

Referring to FIG. 3, a near-eye display (NED) 300 includes a beam scanner 330 optically coupled to a pupil-replicating waveguide 332. The beam scanner 330 is similar to the beam scanner 130 of FIG. 1. The beam scanner 330 further includes a second prismatic element 316 adjoining the reflective polarizer 104. In some embodiments, the reflective polarizer 104 is sandwiched between the beam-folding prismatic element 102 and the second prismatic element 316. The second prismatic element 316 may have the same or similar shape as the beam-folding prismatic element 102, resulting in a compact rhombic structure shown in FIG. 3. The pupil-replicating waveguide 332 may include an input coupler, such as an input grating 334.

In operation, the light beam 110 propagates in the beam-folding prismatic element 102 along a similar path as in the beam scanner 130 of FIG. 1. After reflection from the tiltable reflector 108 and propagation through the reflective polarizer 104, the light beam 110 propagates through the second prismatic element 316, enters the pupil-replicating waveguide 332, and impinges at the input grating 334 of the pupil-replicating waveguide 332. As the tiltable reflector 108 is tilted, the light beam 110 is scanned on the surface of the input grating 334 at different incidence angles, as shown at 110A, 110B, and 110C. The input grating 334 redirects the light beam 110 to propagate within the pupil-replicating waveguide 332, e.g. by TIR from top and bottom surfaces of the pupil-replicating waveguide 332 (not illustrated).

Figure 4:
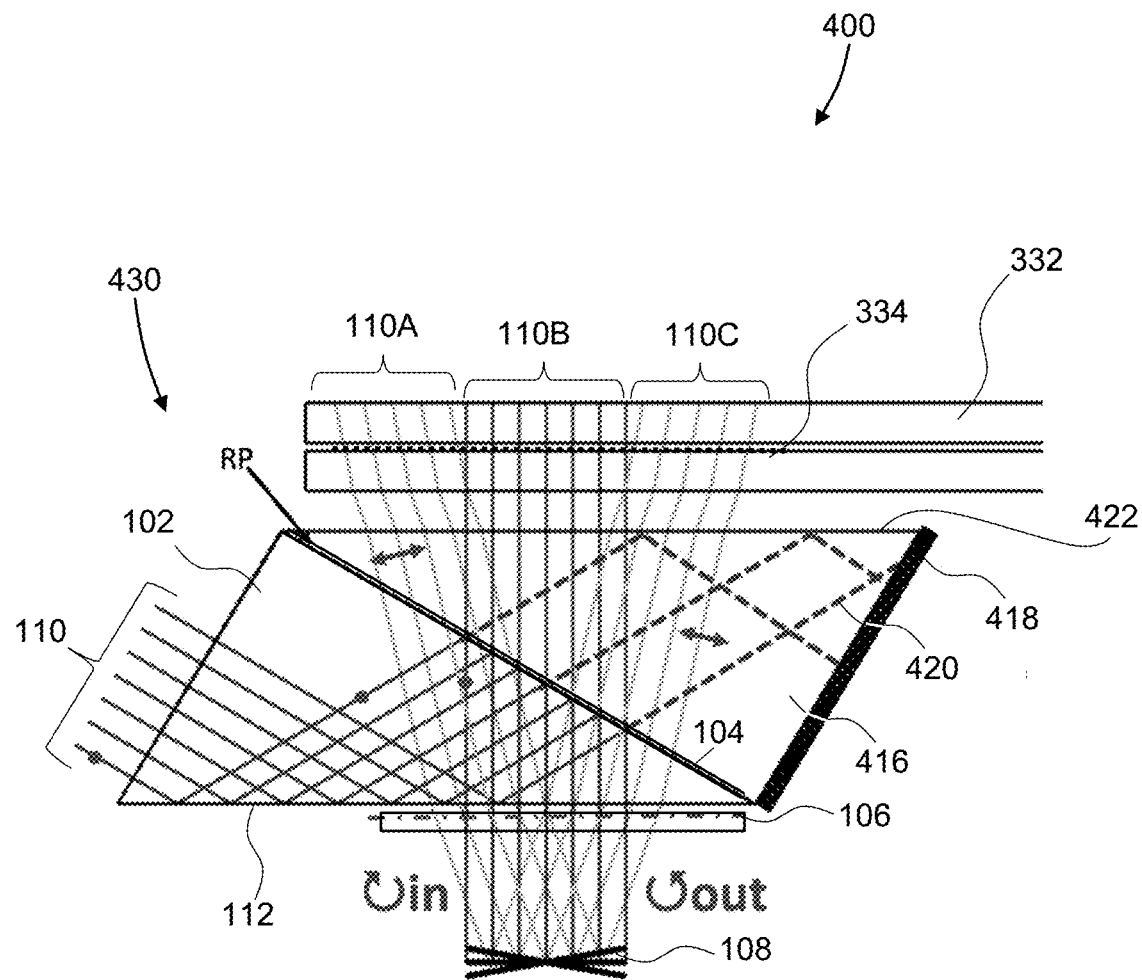
FIG. 4 is a side cross-sectional view of an embodiment of the NED of FIG. 3 where the beam scanner is provided with a beam dump.

Turning to FIG. 4, an NED 400 includes a beam scanner 430 optically coupled to the pupil-replicating waveguide 332. The beam scanner 430 is similar to the beam scanner 330 of FIG. 3. A second prismatic element 416 of the beam scanner 430 of FIG. 4 includes a beam dump 418, e.g. a black absorbing surface, on a side surface of the second prismatic element adjoining the surface bound to the reflective polarizer 104.

In operation, the impinging light beam 110 enters the beam-folding prismatic element 102, is reflected from the second (i.e. bottom) surface 112 of the beam-folding prismatic element 102, and impinges onto the reflective polarizer 104. Ideally, the light beam 110 should be reflected towards the QWP 106 and the tiltable reflector 108; however, due to deviations of the polarization of the light beam 110 from linear polarization perpendicular to the plane of FIG. 4, as well as due to imperfections of the reflective polarizer 104, a small portion 420 (dashed lines) of the light beam 110 will propagate upwards in FIG. 4 towards a top surface 422 of the second prismatic element 416, reflect from the top surface 422, and propagate towards the beam dump 418, which absorbs the portion 420 of the light beam 110, which otherwise may reach the pupil-replicating waveguide 332 after several reflections in the second prismatic element 416. Since the portion 420 is not scanned by the tiltable reflector 108, it may create non-moving artifacts in the image conveyed by the pupil-replicating waveguide 332.

Thus, the function of the beam dump 418 is to absorb the portion 420 of the light beam 110 and some other spuriously reflected beam portions, as the case may be, and thereby prevent spurious reflections of the collimated light beam 110 from ever reaching the pupil-replicating waveguide 332. The spuriously reflected collimated portions of the light beam 110 coupled into the pupil-replicating waveguide 332 may manifest themselves in the image being displayed as bright lines, dots, etc., and the beam dump 418 facilitates their suppression.

Figure 5:
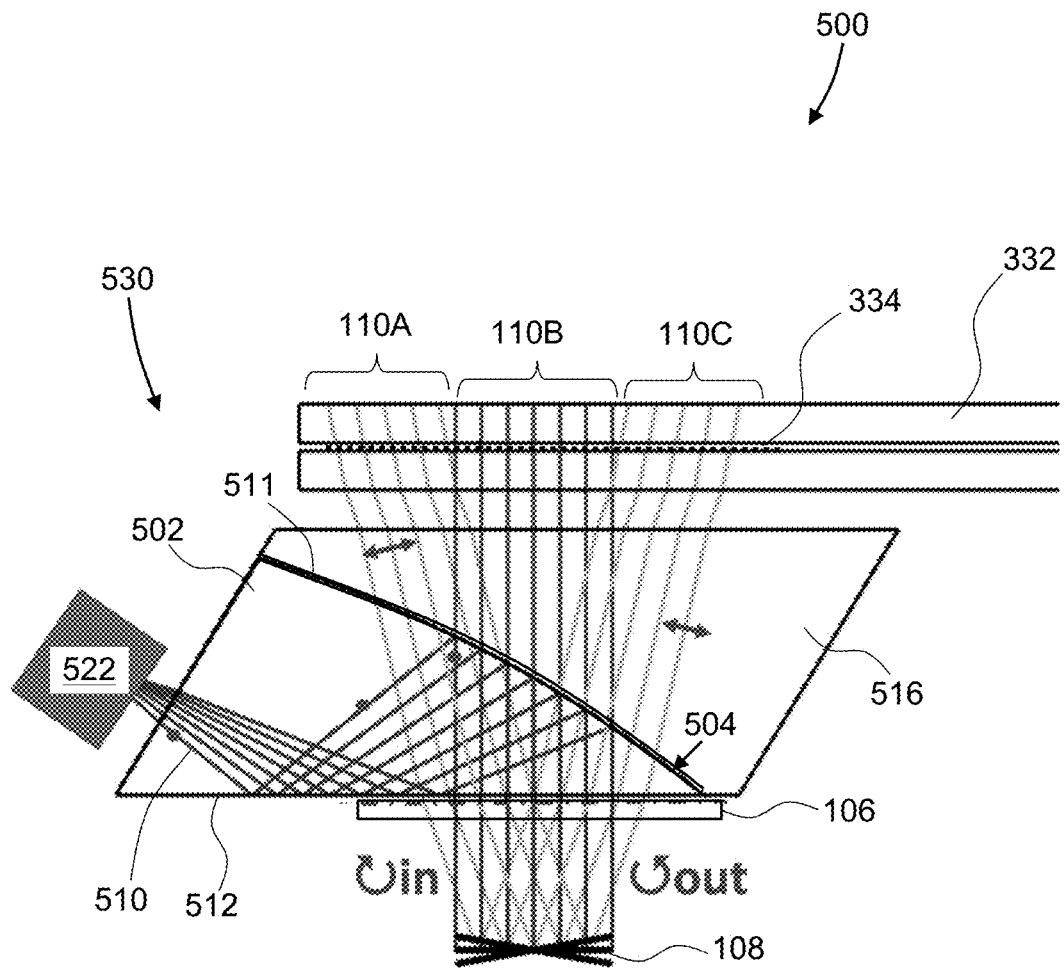
FIG. 5 is a side cross-sectional view of an embodiment of the NED of FIG. 3 where the prismatic elements have matched curved surfaces, with a reflective polarizer sandwiched between the curved surfaces of the two prismatic elements.

Referring now to FIG. 5, a projector 500 includes a light source 522 providing a diverging light beam 510 to a beam scanner 530, which is optically coupled to the pupil-replicating waveguide 332. The beam scanner 530 is similar to the beam scanner 330 of FIG. 3. The beam scanner 530 of FIG. 5 includes a beam-folding prismatic element 502. A first surface 511 of the beam-folding prismatic element 502 is curved for collimating the diverging light beam 510 reflected from the first surface 511. The QWP 106 is disposed proximate a second surface 512 of the beam-folding prismatic element 502.

The beam-folding prismatic element 502 has a second prismatic element 516 including a curved surface matching the curved surface 511 of the beam-folding prismatic element 502. For example, for spherical surfaces, the curved surfaces of the beam-folding prismatic element 502 and the second prismatic element 516 have substantially the same radius of curvature. A curved reflective polarizer 504 is sandwiched between the beam-folding prismatic element 502 and the second prismatic element 516. The shape of the curved reflective polarizer 504 matches the shape of the beam-folding prismatic element 502 and the second prismatic element 516. In operation, the first surface 511 of the beam-folding prismatic element 502 functions as a concave mirror having positive optical power, i.e. focusing power, converting the diverging light beam 510 into a collimated or nearly-collimated light beam propagating in the beam-folding prismatic element 502 and the second prismatic element 516 in a similar manner as explained above with reference to FIG. 3.

Figure 6:
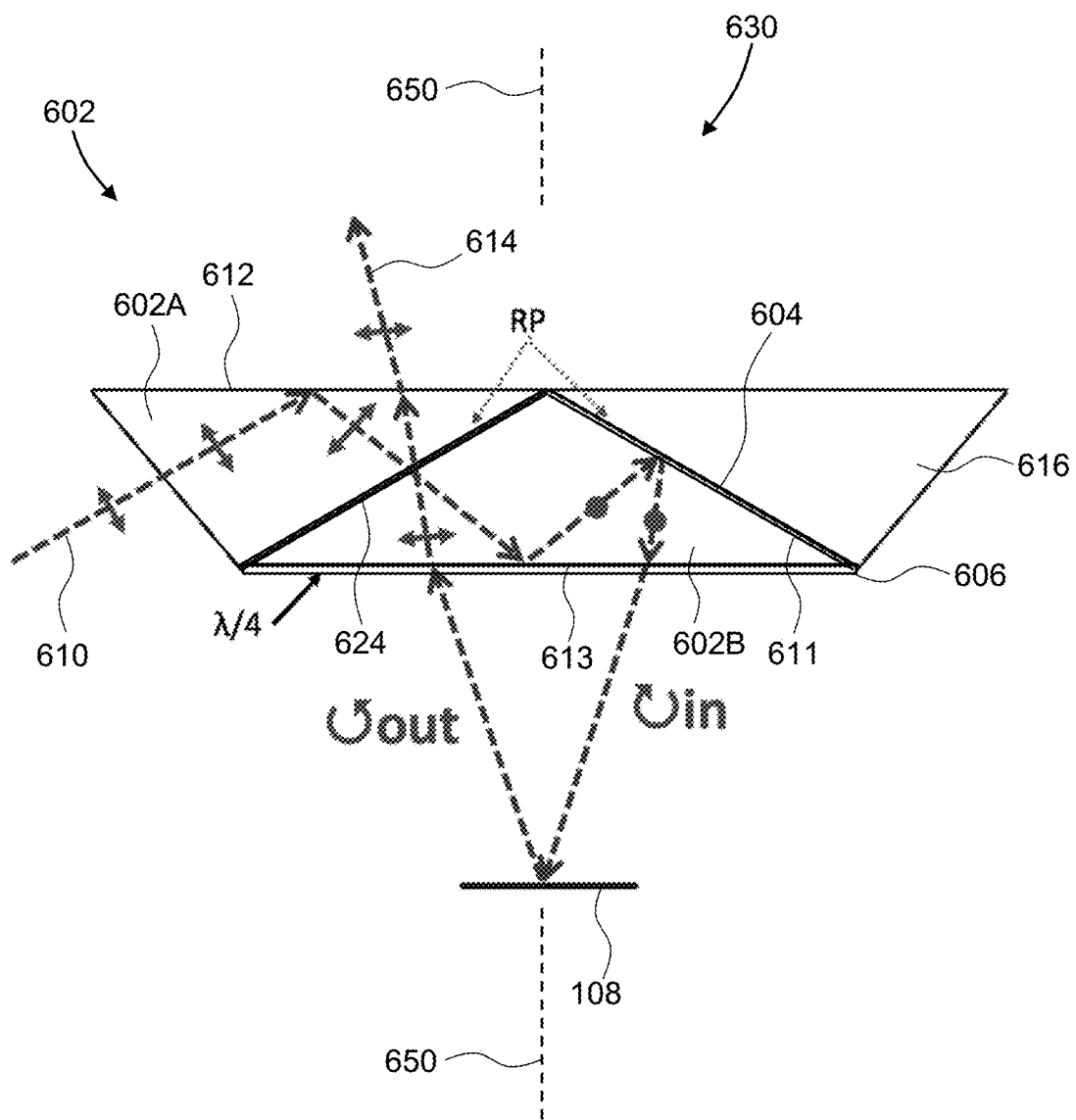
FIG. 6 is a side cross-sectional view a beam scanner with a plurality of prismatic elements for coupling multiple light beams to a same tiltable reflector.

Referring to FIG. 6, a beam scanner 630 includes a beam-folding prismatic element 602 having first 611 and second 112 adjacent surfaces, and a first reflective polarizer 604 disposed at the first surface 611. In the embodiment shown, the beam-folding prismatic element 602 includes first 602A and second 602B portions and a second reflective polarizer 624 sandwiched between the first 602A and second 602B portions of the beam-folding prismatic element 602. Thus, the second reflective polarizer 624 is disposed within the beam-folding prismatic element 602 in an optical path of a first light beam 610, the optical path extending between reflections from the second 612 and third 613 surfaces within the beam-folding prismatic element 602. The first light beam 610 may be provided by a first light source, not shown in FIG. 6.

The third surface 613 of the beam-folding prismatic element 602 is adjacent its second surface 612. A QWP 606 is optically coupled to the third side 613 of the beam-folding prismatic element 602. In some embodiments, the QWP 606 is laminated onto the third side 613. The tiltable reflector 108 is disposed next to the QWP 606. The tiltable reflector 108 may be tilted about one or two non-parallel axes of tilt. In FIG. 6, the tiltable reflector 108 is shown in its nominal, i.e. untilted, position.

In operation, the first light beam 610, which is linearly polarized in plane of FIG. 6 in this example, undergoes a first reflection from the second surface 612, propagates through the second reflective polarizer 624, which is configured to transmit light at that polarization, undergoes a second reflection from the third surface side 613 through the QWP 606. The QWP 606 changes its polarization to a linear polarization perpendicular to the plane of FIG. 6, because the first light beam 610 propagates through the QWP 606 twice.

The first reflective polarizer 604 is configured to reflect light at linear polarization perpendicular to the plane of FIG. 6. Thus, the first light beam 610 is reflected by the first reflective polarizer 604 and exits the second portion 602B of the beam-folding prismatic element 602 at the third surface 613 through the QWP 606. Upon exiting the third surface 613, the first light 610 is circularly polarized (e.g. right-handed circular polarization). Then, the first light beam 610 is reflected by the tiltable reflector 108 at a variable angle depending on the current tilt angle of the tiltable reflector 108. The reflected light beam 610 remains circularly polarized, but the handedness is flipped (e.g. becomes left-handed circularly polarized). The reflected light beam 610 propagates back through the QWP 606, which changes the polarization of the first light beam 610 back to linear polarization in the plane of FIG. 6. The second linear polarizer 624 is configured to transmit light at that polarization, and the first light beam 610 propagates thorough the second reflective polarizer 624, and out of the first portion 602A of the beam-folding prismatic element 602 forming an output light beam 614. The beam angle of the output light beam 614 depends on the tilt angle (in x and y planes) of the tiltable reflector 108.

In some embodiments, the beam-folding prismatic element 602 may further include a second prismatic element 616 coupled to the first surface 611 of the beam-folding prismatic element 602 through the first reflective polarizer 604, which may be sandwiched between the second portion 602B of the beam-folding prismatic element 602 and the second prismatic element 616. The second prismatic element 616 may have the same shape as the first portion 602A of the beam-folding prismatic element 602, making the structure of the beam-folding prismatic element 602 symmetrical about a vertical plane 650 running through the middle of the beam-folding prismatic element 602 and perpendicular to the plane of FIG. 6.

Figure 7A:
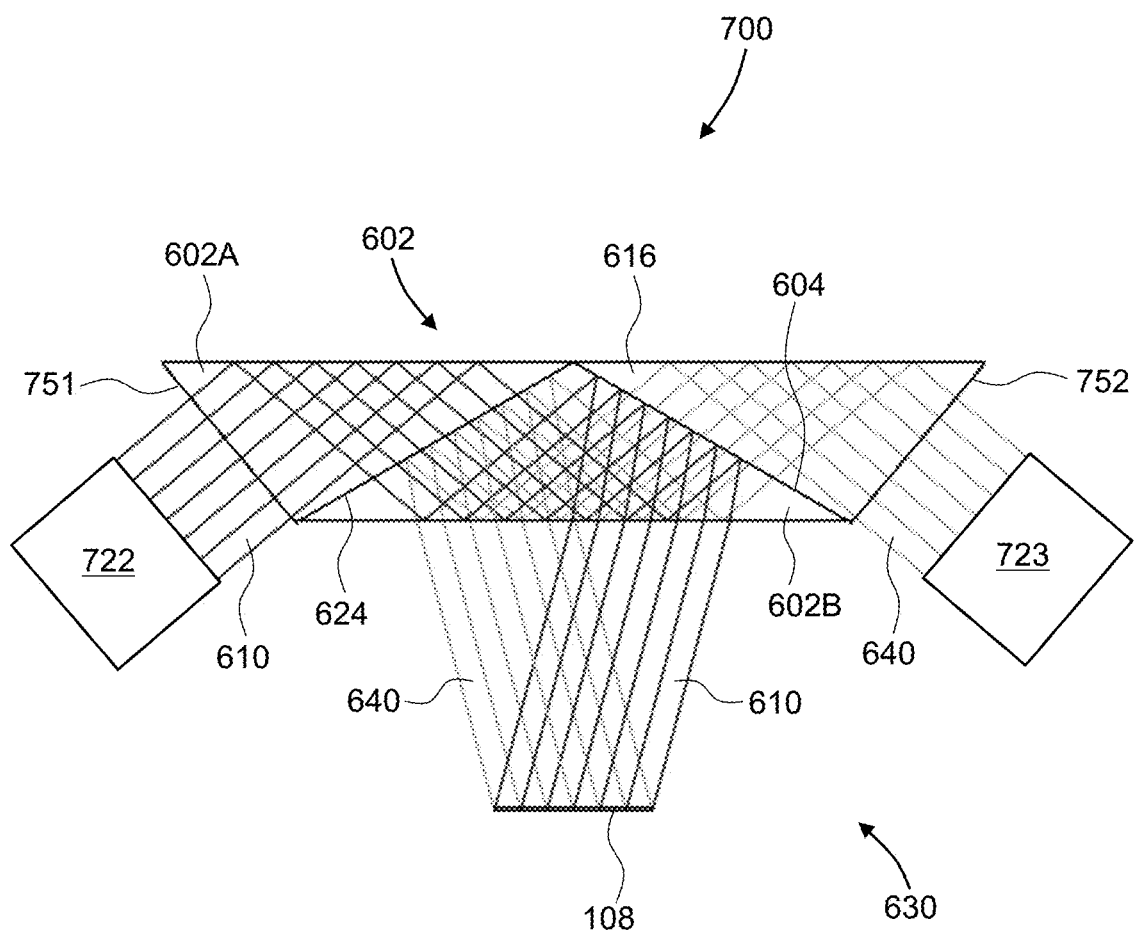
FIG. 7A is a side cross-sectional view of an NED including the beam scanner of FIG. 6, showing propagation of two light beams from two light sources to a common tiltable reflector.

Referring to FIG. 7A, a projector 700 includes the beam scanner 630 of FIG. 6, a first light source 722 for providing the first light beam 610, and a second light source 723 for providing a second light beam 640. In the embodiment shown, the beam scanner 630 includes the second prismatic element 616, which receives the second light beam 640 from the second light source 723. The second light beam 640 impinges on the second prismatic element 616, and couples the second light beam 640 to the beam-folding prismatic element 602 through the first reflective polarizer 604. In FIG. 7A, some elements of the beam scanner 630 are omitted for clarity.

The first light beam 610 enters the first portion 602A of the beam-folding prismatic element 602 through a first input surface 751; and the second light beam 640 enters the second prismatic element 616 through a second input surface 752. Since the beam-folding prismatic element 602 is symmetrical, the optical path of the second light beam 640 is similar to the optical path of the first light beam 610, being a mirror reflection of the optical path of the first light beam 610, as seen in FIG. 7A. Specifically, referring to FIGS. 6 and 7A, the second light beam 640 undergoes a first reflection from within the second prismatic element 616, propagates through the first reflective polarizer 604, undergoes a second reflection from the third surface 613 through the QWP 606 (FIG. 6), is reflected by the second reflective polarizer 624, exits the beam-folding prismatic element 602 at its third surface 613 through the QWP 606, is reflected by the tiltable reflector 108 to propagate back through the QWP 606, thorough the first reflective polarizer 604, and out of the second portion 616 of the beam-folding prismatic element 602.

Figure 7B:
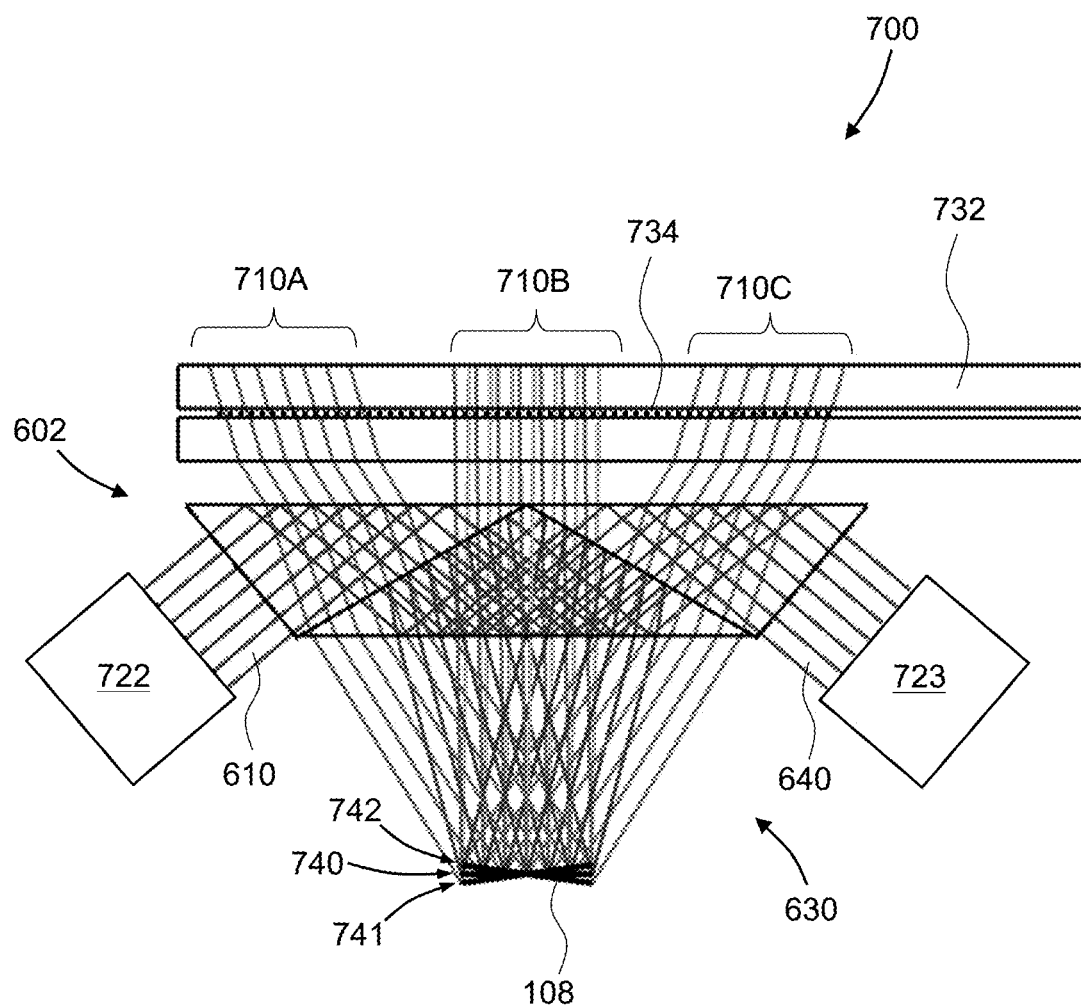
FIG. 7B is a side cross-sectional view of the NED of FIG. 7A showing propagation of two light beams from the two light sources all the way to the pupil-replicating waveguide.

Beam paths of the first 610 and second 640 light beams are further illustrated in FIG. 7B, which shows the projector 700 further including a pupil-replicating waveguide 732 having an input grating 734. The input grating 734 of the pupil-replicating waveguide 732 is optically coupled to the beam scanner 630. The tiltable reflector 108 is shown in two positions 741 and 742 at two different angles of tilt away from a normal position 740 at zero angle of tilt. As the tiltable reflector 108 is tilted from the first position 741 to the second position 742, the first 610 and second 640 light beams are scanned together on the surface of the input grating 734 at different incidence angles. For example, at the first position 741 of the tiltable reflector 108, the first light beam 610 is at a position 710A and the second light beam 640 is at a position 710B. At the second position 742 of the tiltable reflector 108, the first light beam 610 is at a position 710B and the second light beam 640 is at a position 710C. Thus, the first 610 and second 640 light beams are scanned over a common central portion of field of view (FOV). This may enable one to increase the spatial resolution of the displayed image in the central portion of FOV, provide redundancy, increase image brightness, etc.

The number of light beams and light sources may be further increased as required. By way of a non-limiting example, referring to FIG. 8 with further reference to FIG. 6, a projector 800 is based on a beam scanner similar to the beam scanner 630 of FIG. 6 but is capable of scanning beams from four separate light sources. Each light source may include several emitters, including one more emitters for each color channel. A beam-folding prismatic element 802 of the projector 800 of FIG. 8 includes first 811 and second 812 adjacent surfaces (the second surface 812 is the top square surface in the top view of FIG. 8 shown in solid lines), a third surface 813 (the bottom square surface in the top view of FIG. 8 shown with dashed lines), a fourth surface 814, and a fifth surface 815.

A first reflective polarizer 804 is disposed at the first surface 811. A second reflective polarizer 824 is disposed within the beam-folding prismatic element 802 in an optical path of the first light beam 610 between reflections from the second 812 and first 811 surfaces within the beam-folding prismatic element 802. A second prismatic element 816 is coupled to the first surface 811 for receiving the second light beam 640 impinging on the second prismatic element 816, and for coupling the second light beam 640 to the beam-folding prismatic element 802 through the first reflective polarizer 804. A third reflective polarizer 834 is disposed at the fourth surface 814. The third reflective polarizer 834 adjoins the first 804 and second 824 reflective polarizers. A fourth reflective polarizer 854 is disposed at the fifth surface 815. The fourth reflective polarizer 854 adjoins the first 804 and second 824 reflective polarizers. The first 804, the second 824, the third 834, and the fourth 854 reflective polarizers, shown in shaded triangles, form a symmetric pyramidal structure having a common apex at the center, four sides, and a common rectangular base at the third surface 813.

A third prismatic element 832 is coupled to the fourth surface 814 for receiving a third light beam 810 from a third light source 822 impinging on the third prismatic element 832, and for coupling the third light beam 810 to the beam-folding prismatic element 802 through the third reflective polarizer 834. Similarly, a fourth prismatic element 846 is coupled to the fifth surface 815 for receiving a fourth light beam 840 from a fourth light source 823 impinging on the fourth prismatic element 846, and for coupling the fourth light beam 840 to the beam-folding prismatic element 802 through the fourth reflective polarizer 854.

Figure 8:
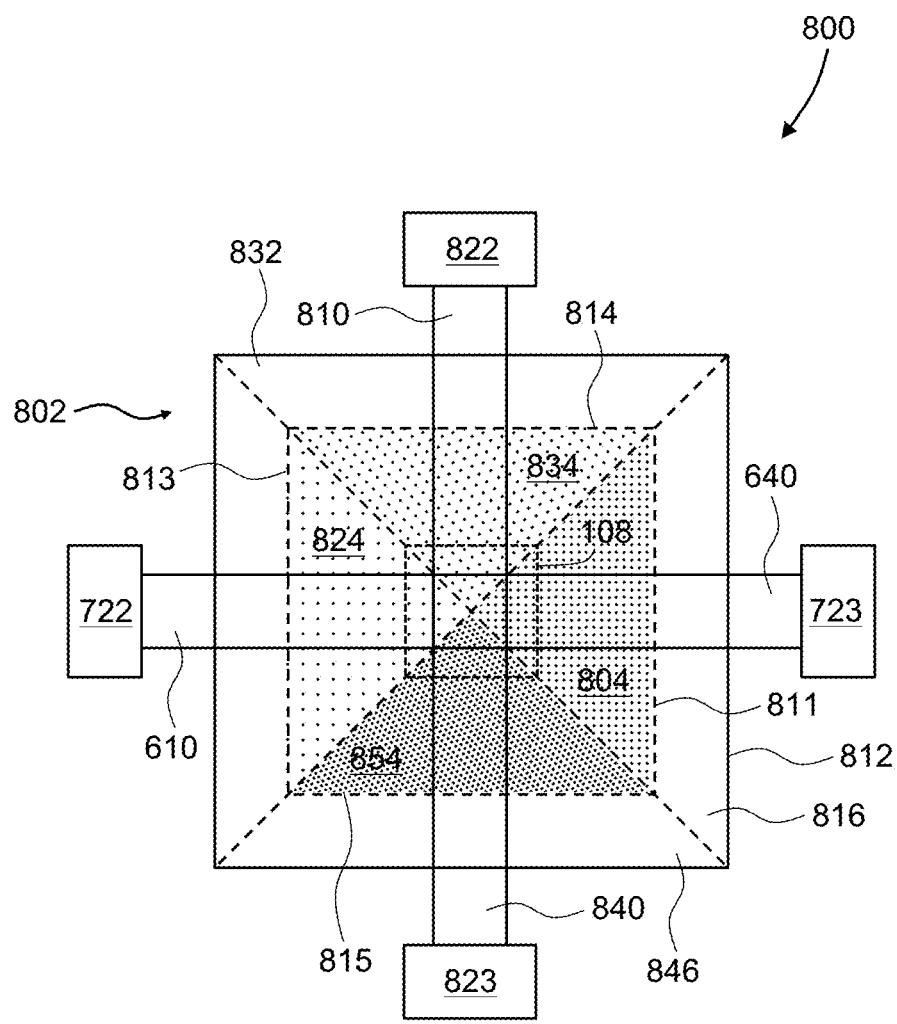
FIG. 8 is a top view of an NED including four light sources and a symmetrical beam-folding prismatic element.
Figure 9A:
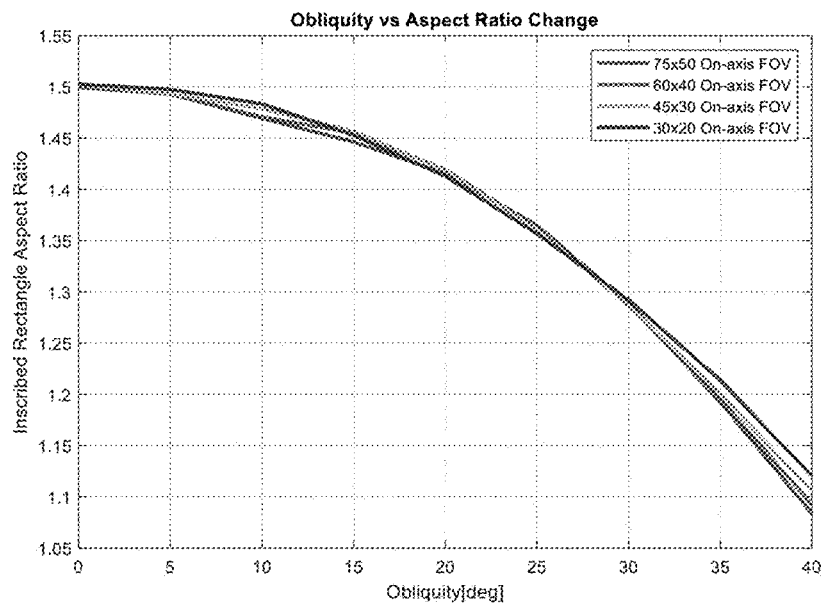
FIG. 9A is a graph of aspect ratio of a field of view (FOV) of a scanning projector display as a function of beam obliquity.
Figure 9B:
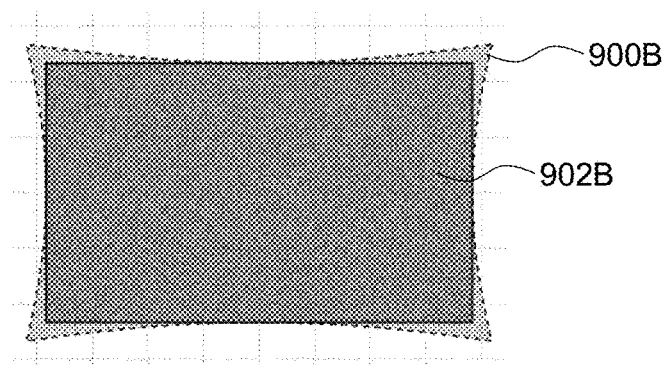
FIG. 9B is a schematic view of a FOV at zero obliquity in FIG. 9A.
Figure 9C:
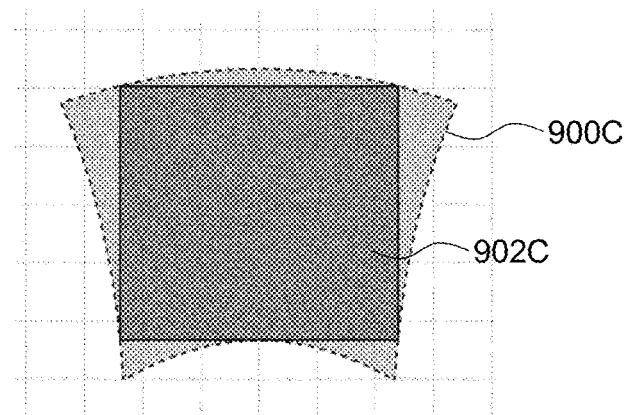
FIG. 9C is a schematic view of a FOV at maximum obliquity in FIG. 9A.

The projectors 500 of FIG. 5, 700 of FIG. 7, and 800 of FIG. 8 provide a low-obliquity coupling of light beam(s) to a tiltable reflector. Herein, the term "low obliquity" means a low angle of incidence, i.e. a normal incidence, at the tiltable reflector when in a nominal, e.g. a center or zero, angle of tilt. One advantage of having low obliquity is illustrated in FIGS. 9A to 9C. Referring first to FIG. 9A, an aspect ratio of a FOV of a projector using a tiltable reflector is plotted as a function of obliquity, i.e. angle of incidence at the tiltable reflector when in nominal or center position. The aspect ratio is plotted for four cases: 75 degrees by 50 degrees on-axis FOV; 60 degrees by 40 degrees on-axis FOV; 45 degrees by 30 degrees on-axis FOV; and 30 degrees by 20 degrees on-axis FOV. The aspect ratio drops from 1.5 at zero obliquity, i.e. normal incidence, to about 1.1 at 40 degree obliquity angle.

FIG. 9B shows a zero-obliquity scanning angular area 900B and an associated inscribed rectangular FOV 902B. The zero-obliquity FOV 902B solid angle is covering most of the angular area 900B. By comparison, FIG. 9C shows a 40 degrees obliquity scanning angular area 900C and an associated inscribed rectangular FOV 902C. The FOV 902C solid angle occupies a smaller percentage of the angular area 900C, and is almost 2 times less than the zero-obliquity FOV 902B, and has a different aspect ratio. Thus, the low-obliquity coupling improves the utilization of the scanning range of the tiltable reflector, enabling wider fields of view at the same scanning range of the tiltable reflector.

Figure 10:
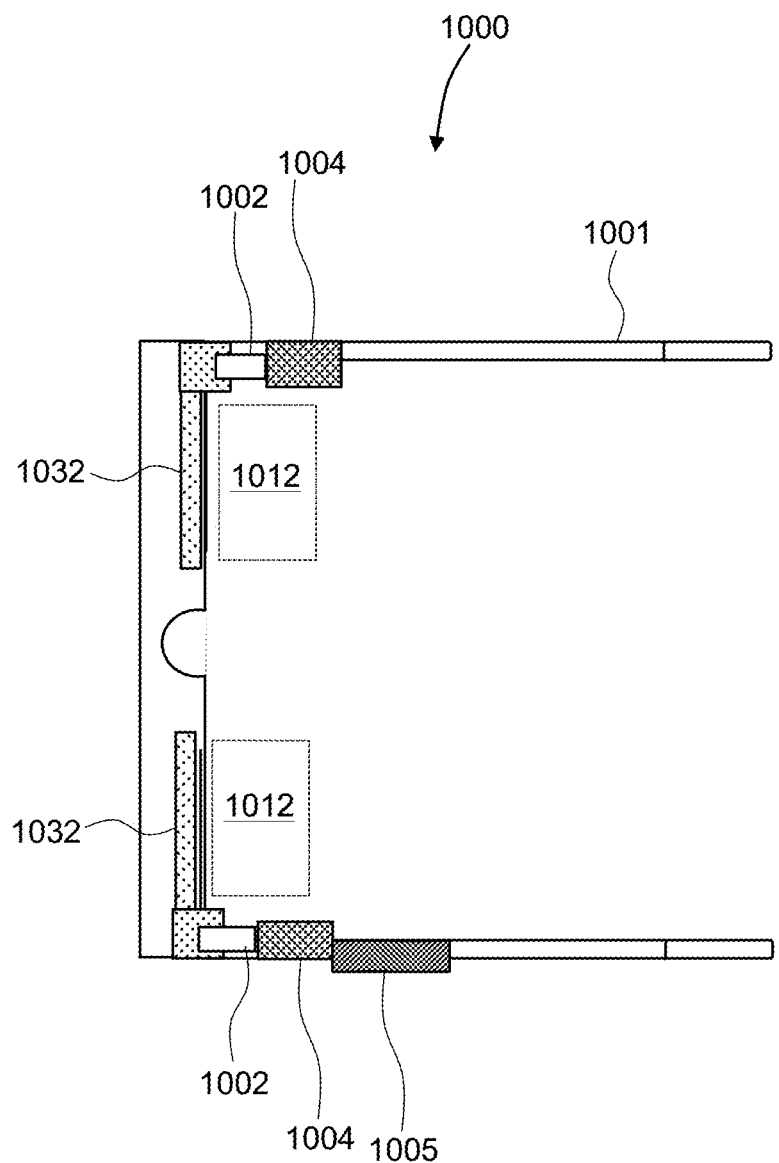
FIG. 10 is a plan cross-sectional view of a near-eye display including a beam scanner of this disclosure.

Referring to FIG. 10, a near-eye display (NED) 1000 includes a frame 1001 having a form factor of a pair of glasses. The frame 1001 may support, for each eye: a projector 1002 for providing display light carrying an image in angular domain, an electronic driver 1004 operably coupled to the projector 1002 for powering the projector 1002, and a pupil replicator 1032 optically coupled to the projector 1002.

Each projector 1002 may include a beam scanner described herein, for example and without limitation the beam scanner 100 of FIG. 1, the beam scanner 330 of FIG. 3, the beam scanner 430 of FIG. 4, the beam scanner 530 of FIG. 5, the beam scanner 630 of FIG. 6, etc. In some embodiments, each projector 1002 includes the projector 500 of FIG. 5, the projector 700 of FIGS. 7A and 7B, and/or the projector 800 of FIG. 8. Light sources for these projectors may include a substrate supporting an array of single-mode or multimode semiconductor light sources, e.g. side-emitting laser diodes, vertical-cavity surface-emitting laser diodes, SLEDs, or light-emitting diodes, for providing a plurality of light beams as described above with reference to FIGS. 2A, 2B, and 2C. Collimators of the light sources may include concave mirrors, bulk lenses, Fresnel lenses, holographic lenses, etc. The pupil replicators 1032 may include waveguides equipped with a plurality of surface relief and/or volume holographic gratings. The function of the pupil replicators 1032 is to provide multiple laterally offset copies of the display light beams provided by the projectors 1002 at respective eyeboxes 1012.

A controller 1005 is operably coupled to the light sources and tiltable reflectors of the projectors 1002. The controller 1005 may be configured to determine the X- and Y-tilt angles of the tiltable reflectors of the projectors 1002. The controller 1005 determines which pixel or pixels of the image to be displayed correspond to the determined X- and Y-tilt angles. Then, the controller 1005 determines the brightness and/or color of these pixels, and operates the electronic drivers 1004 accordingly for providing powering electric pulses to the light sources of the projectors 1002 to produce light pulses at power level(s) corresponding to the determined pixel brightness and color.

In some embodiments, the controller 1005 may be configured to operate, for each eye, the tiltable reflector to cause the light beam reflected from the tiltable reflector and propagated through the respective beam-folding prismatic element to have a beam angle corresponding to a pixel of an image to be displayed. The controller 1005 may be further configured to operate the light source in coordination with operating the tiltable reflector, such that the light beam has brightness and/or color corresponding to first pixel being displayed. In multi-light source embodiments, the controller 1005 may be configured to operate the corresponding light sources in coordination, to provide a larger FOV, an improved scanning resolution, increased brightness of the display, etc., as described herein. For example, in embodiment where the projectors for both of user's eyes each include two light sources, the controller may be configured to operate the tiltable reflector to cause the second light beam reflected from the tiltable reflector and propagated through the beam-folding prismatic element to have a beam angle corresponding to a second pixel of an image to be displayed, and operate the second light source in coordination with operating the tiltable reflector, such that the second light beam has brightness corresponding to the second pixel.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 11A:
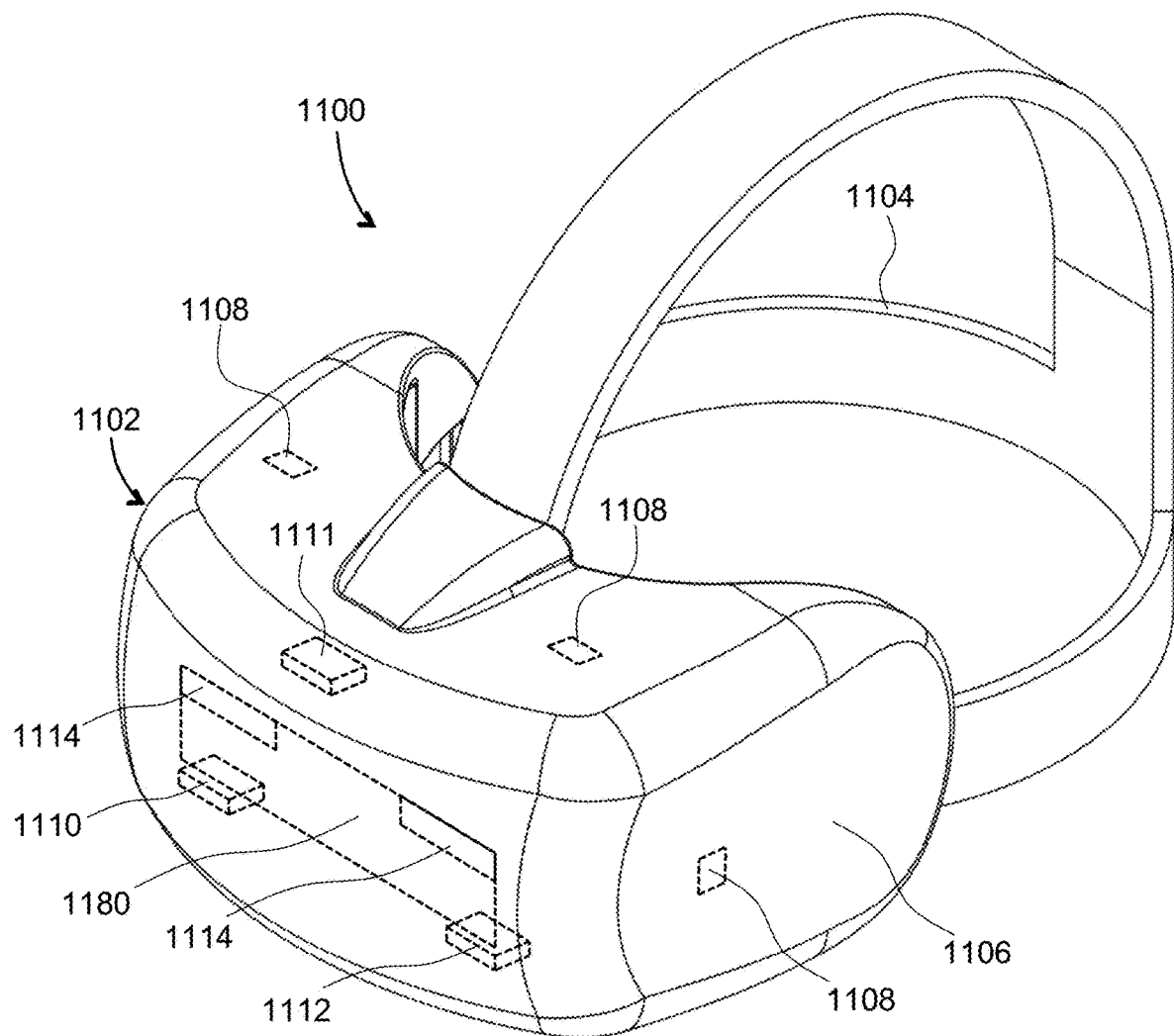
FIG. 11A is an isometric view of a head-mounted display of the present disclosure.

Referring to FIG. 11A, an HMD 1100 is an example of an AR/VR wearable display system which encloses the user's face, for a greater degree of immersion into the AR/VR environment. The HMD 1100 is an embodiment of the NED 1000 of FIG. 10, for example. The function of the HMD 1100 is to augment views of a physical, real-world environment with computer-generated imagery, and/or to generate the entirely virtual 3D imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head. A display system 1180 may be disposed in the front body 1102 for presenting AR/VR imagery to the user. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR), or a similar device. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes also allows the HMD 1100 to determine the gaze direction of the user and to adjust the image generated by the display system 1180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Figure 11B:
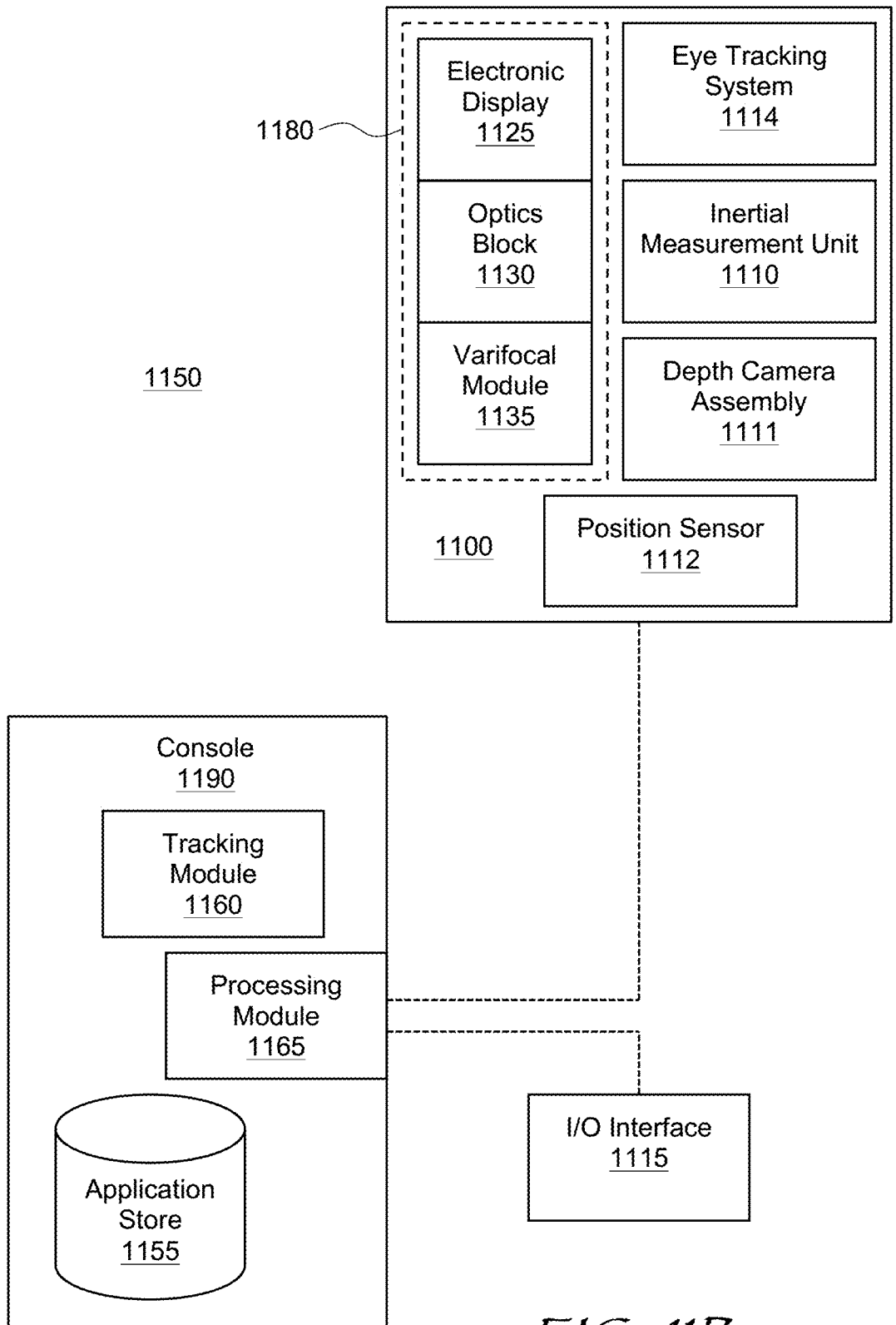
FIG. 11B is a block diagram of a virtual reality system including the headset of FIG. 11A.

Referring to FIG. 11B, an AR/VR system 1150 is an example implementation of a wearable display system. The AR/VR system 1150 includes the HMD 1100 of FIG. 11A, an external console 1190 storing various AR/VR applications, setup and calibration procedures, 3D videos, etc., and an input/output (I/O) interface 1115 for operating the console 1190 and/or interacting with the AR/VR environment. The HMD 1100 may be "tethered" to the console 1190 with a physical cable, or connected to the console 1190 via a wireless communication link such as Bluetooth®, Wi-Fi, etc. There may be multiple HMDs 1100, each having an associated I/O interface 1115, with each HMD 1100 and I/O interface(s) 1115 communicating with the console 1190. In alternative configurations, different and/or additional components may be included in the AR/VR system 1150. Additionally, functionality described in conjunction with one or more of the components shown in FIGS. 11A and 11B may be distributed among the components in a different manner than described in conjunction with FIGS. 11A and 11B in some embodiments. For example, some or all of the functionality of the console 1115 may be provided by the HMD 1100, and vice versa. The HMD 1100 may be provided with a processing module capable of achieving such functionality.

As described above with reference to FIG. 11A, the HMD 1100 may include the eye tracking system 1114 (FIG. 11B) for tracking eye position and orientation, determining gaze angle and convergence angle, etc., the IMU 1110 for determining position and orientation of the HMD 1100 in 3D space, the DCA 1111 for capturing the outside environment, the position sensor 1112 for independently determining the position of the HMD 1100, and the display system 1180 for displaying AR/VR content to the user. The display system 1180 includes (FIG. 11B) an electronic display 1125, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1180 further includes an optics block 1130, whose function is to convey the images generated by the electronic display 1125 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1180 may further include a varifocal module 1135, which may be a part of the optics block 1130. The function of the varifocal module 1135 is to adjust the focus of the optics block 1130 e.g. to compensate for vergence-accommodation conflict, to correct for vision defects of a particular user, to offset aberrations of the optics block 1130, etc.

The I/O interface 1115 is a device that allows a user to send action requests and receive responses from the console 1190. An action request is a request to perform a particular action. For example, an action request may be an instruction to start or end capture of image or video data or an instruction to perform a particular action within an application. The I/O interface 1115 may include one or more input devices, such as a keyboard, a mouse, a game controller, or any other suitable device for receiving action requests and communicating the action requests to the console 1190. An action request received by the I/O interface 1115 is communicated to the console 1190, which performs an action corresponding to the action request. In some embodiments, the I/O interface 1115 includes an IMU that captures calibration data indicating an estimated position of the I/O interface 1115 relative to an initial position of the I/O interface 1115. In some embodiments, the I/O interface 1115 may provide haptic feedback to the user in accordance with instructions received from the console 1190. For example, haptic feedback can be provided when an action request is received, or the console 1190 communicates instructions to the I/O interface 1115 causing the I/O interface 1115 to generate haptic feedback when the console 1190 performs an action.

The console 1190 may provide content to the HMD 1100 for processing in accordance with information received from one or more of: the IMU 1110, the DCA 1111, the eye tracking system 1114, and the I/O interface 1115. In the example shown in FIG. 11B, the console 1190 includes an application store 1155, a tracking module 1160, and a processing module 1165. Some embodiments of the console 1190 may have different modules or components than those described in conjunction with FIG. 11B. Similarly, the functions further described below may be distributed among components of the console 1190 in a different manner than described in conjunction with FIGS. 11A and 11B.

The application store 1155 may store one or more applications for execution by the console 1190. An application is a group of instructions that, when executed by a processor, generates content for presentation to the user. Content generated by an application may be in response to inputs received from the user via movement of the HMD 1100 or the I/O interface 1115. Examples of applications include: gaming applications, presentation and conferencing applications, video playback applications, or other suitable applications.

The tracking module 1160 may calibrate the AR/VR system 1150 using one or more calibration parameters and may adjust one or more calibration parameters to reduce error in determination of the position of the HMD 1100 or the I/O interface 1115. Calibration performed by the tracking module 1160 also accounts for information received from the IMU 1110 in the HMD 1100 and/or an IMU included in the I/O interface 1115, if any. Additionally, if tracking of the HMD 1100 is lost, the tracking module 1160 may re-calibrate some or all of the AR/VR system 1150.

The tracking module 1160 may track movements of the HMD 1100 or of the I/O interface 1115, the IMU 1110, or some combination thereof. For example, the tracking module 1160 may determine a position of a reference point of the HMD 1100 in a mapping of a local area based on information from the HMD 1100. The tracking module 1160 may also determine positions of the reference point of the HMD 1100 or a reference point of the I/O interface 1115 using data indicating a position of the HMD 1100 from the IMU 1110 or using data indicating a position of the I/O interface 1115 from an IMU included in the I/O interface 1115, respectively. Furthermore, in some embodiments, the tracking module 1160 may use portions of data indicating a position or the HMD 1100 from the IMU 1110 as well as representations of the local area from the DCA 1111 to predict a future location of the HMD 1100. The tracking module 1160 provides the estimated or predicted future position of the HMD 1100 or the I/O interface 1115 to the processing module 1165.

The processing module 1165 may generate a 3D mapping of the area surrounding some or all of the HMD 1100 ("local area") based on information received from the HMD 1100. In some embodiments, the processing module 1165 determines depth information for the 3D mapping of the local area based on information received from the DCA 1111 that is relevant for techniques used in computing depth. In various embodiments, the processing module 1165 may use the depth information to update a model of the local area and generate content based in part on the updated model.

The processing module 1165 executes applications within the AR/VR system 1150 and receives position information, acceleration information, velocity information, predicted future positions, or some combination thereof, of the HMD 1100 from the tracking module 1160. Based on the received information, the processing module 1165 determines content to provide to the HMD 1100 for presentation to the user. For example, if the received information indicates that the user has looked to the left, the processing module 1165 generates content for the HMD 1100 that mirrors the user's movement in a virtual environment or in an environment augmenting the local area with additional content. Additionally, the processing module 1165 performs an action within an application executing on the console 1190 in response to an action request received from the I/O interface 1115 and provides feedback to the user that the action was performed. The provided feedback may be visual or audible feedback via the HMD 1100 or haptic feedback via the I/O interface 1115.

In some embodiments, based on the eye tracking information (e.g., orientation of the user's eyes) received from the eye tracking system 1114, the processing module 1165 determines resolution of the content provided to the HMD 1100 for presentation to the user on the electronic display 1125. The processing module 1165 may provide the content to the HMD 1100 having a maximum pixel resolution on the electronic display 1125 in a foveal region of the user's gaze. The processing module 1165 may provide a lower pixel resolution in other regions of the electronic display 1125, thus lessening power consumption of the AR/VR system 1150 and saving computing resources of the console 1190 without compromising a visual experience of the user. In some embodiments, the processing module 1165 can further use the eye tracking information to adjust where objects are displayed on the electronic display 1125 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A beam scanner comprising:
   a beam-folding prismatic element comprising:
   first and second adjacent surfaces;
   a first reflective polarizer at the first surface;
   a second reflective polarizer within the beam-folding prismatic element;
   a third surface; and
   a quarter-wave waveplate (QWP) optically coupled to the third surface; and
   a tiltable reflector optically coupled to the QWP;
   wherein in operation, the first light beam undergoes a first reflection from the second surface, propagates through the second reflective polarizer, undergoes a second reflection from the third surface through the QWP, is reflected by the first reflective polarizer, exits the beam-folding prismatic element at its third surface through the QWP, and is reflected by the tiltable reflector at a variable angle to propagate back through the QWP, through the second reflective polarizer, and out of the beam-folding prismatic element.

2. The beam scanner of claim 1, wherein the impinging first light beam has a first polarization state, and wherein the first second reflective polarizer is configured to transmit light having the first polarization state and to reflect light having a second, orthogonal polarization state.

3. The beam scanner of claim 1, wherein the beam-folding prismatic element is configured to reflect the first light beam at the second surface by total internal reflection.

4. The beam scanner of claim 1, wherein the QWP extends substantially parallel to the third surface of the beam-folding prismatic element and is optically coupled to the third surface.

5. The beam scanner of claim 1, wherein the tiltable reflector comprises a microelectromechanical system (MEMS) tiltable reflector.

6. The beam scanner of claim 5, wherein the MEMS tiltable reflector is tiltable about two axes.

7. The beam scanner of claim 1, wherein the first and second surfaces form an angle therebetween of less than 45 degrees.

8. The beam scanner of claim 1, further comprising a second prismatic element coupled to the first surface of the beam-folding prismatic element, for receiving a second light beam impinging on the second prismatic element, and for coupling the second light beam to the beam-folding prismatic element through the first reflective polarizer.

9. The beam scanner of claim 8, wherein the beam-folding prismatic element further comprises:
   a fourth surface and a third reflective polarizer at the fourth surface, wherein the third reflective polarizer adjoins the first and second reflective polarizers;
   a fifth surface and a fourth reflective polarizer at the fifth surface, wherein the fourth reflective polarizer adjoins the first and second reflective polarizers;
   a third prismatic element coupled to the fourth surface of the beam-folding prismatic element, for receiving a third light beam impinging on the third prismatic element, and for coupling the third light beam to the beam-folding prismatic element through the third reflective polarizer; and
   a fourth prismatic element coupled to the fifth surface of the beam-folding prismatic element, for receiving a fourth light beam impinging on the fourth prismatic element, and for coupling the fourth light beam to the beam-folding prismatic element through the fourth reflective polarizer.

10. The beam scanner of claim 9, wherein the first, the second, the third, and the fourth reflective polarizers form a symmetric pyramidal structure having a common apex, four sides, and a common rectangular base.

11. A projector comprising:
    a first light source for providing a first light beam;
    a beam-folding prismatic element comprising first and second adjacent surfaces and a first reflective polarizer at the first surface, wherein the beam-folding prismatic element is configured to reflect an impinging first light beam at least twice from within the beam-folding prismatic element, including one reflection from the first reflective polarizer, before redirecting the first light beam out of the beam-folding prismatic element through the second surface;
    a quarter-wave waveplate (QWP) configured for receiving and propagating therethrough the first light beam exiting the beam-folding prismatic element;
    a tiltable reflector configured to receive the first light beam and reflect the first light beam at a variable angle back towards the QWP;
    wherein in operation, the first light beam propagated through the QWP after reflection from the tiltable reflector propagates through the beam-folding prismatic element;
    the projector further comprising:
    a second light source for providing a second light beam; and
    a second prismatic element coupled to the first surface of the beam-folding prismatic element, for receiving the second light beam impinging on the second prismatic element, and for coupling the second light beam to the beam-folding prismatic element through the first reflective polarizer;
    wherein the beam-folding prismatic element further comprises a second reflective polarizer disposed within the beam-folding prismatic element in an optical path of the first light beam between reflections from the second and first surfaces within the beam-folding prismatic element, and wherein the QWP is optically coupled to a third surface of the beam-folding prismatic element.

12. The projector of claim 11, wherein in operation, the first light beam undergoes a first reflection from the second surface, propagates through the second reflective polarizer, undergoes a second reflection from the third surface through the QWP, is reflected by the first reflective polarizer, exits the beam-folding prismatic element at its third surface through the QWP, is reflected by the tiltable reflector to propagate back through the QWP, thorough the second reflective polarizer, and out of the beam-folding prismatic element; and
    wherein in operation, the second light beam undergoes a first reflection from within the second prismatic element, propagates through the first reflective polarizer, undergoes a second reflection from the third surface through the QWP, is reflected by the second reflective polarizer, exits the beam-folding prismatic element at its third surface through the QWP, is reflected by the tiltable reflector to propagate back through the QWP, through the first reflective polarizer, and out of the beam-folding prismatic element.

13. The projector of claim 11, wherein the tiltable reflector comprises a 2D microelectromechanical system (MEMS) tiltable reflector.

14. A near-eye display comprising:
    a first light source for providing a first light beam;
    a beam-folding prismatic element comprising first and second adjacent surfaces and a first reflective polarizer at the first surface, wherein the beam-folding prismatic element is configured to reflect an impinging first light beam at least twice from within the beam-folding prismatic element, including one reflection from the first reflective polarizer, before redirecting the first light beam out of the beam-folding prismatic element through the second surface;
    a quarter-wave waveplate (QWP) configured for receiving and propagating therethrough the first light beam exiting the beam-folding prismatic element;
    a tiltable reflector configured to receive the first light beam and reflect the first light beam at a variable angle back towards the QWP, wherein in operation, the first light beam propagated through the QWP after reflection from the tiltable reflector propagates through the beam-folding prismatic element; and
    a controller operably coupled to the first light source and the tiltable reflector and configured to:
    operate the tiltable reflector to cause the first light beam reflected from the tiltable reflector and propagated through the beam-folding prismatic element to have a beam angle corresponding to a first pixel of an image to be displayed; and operate the first light source in coordination with operating the tiltable reflector, such that the first light beam has brightness corresponding to the first pixel;

the near-eye display further comprising:

a second light source for providing a second light beam; and a second prismatic element coupled to the first surface of the beam-folding prismatic element, for receiving the second light beam impinging on the second prismatic element, and for coupling the second light beam to the beam-folding prismatic element through the first reflective polarizer;

wherein the beam-folding prismatic element further comprises a second reflective polarizer disposed within the beam-folding prismatic element in an optical path of the first light beam between reflections from the second and first surfaces within the beam-folding prismatic element, and wherein the QWP is optically coupled to a third surface of the beam-folding prismatic element; and wherein the controller is operably coupled to the second light source and configured to:

operate the tiltable reflector to cause the second light beam reflected from the tiltable reflector and propagated through the beam-folding prismatic element to have a beam angle corresponding to a second pixel of the image to be displayed; and operate the second light source in coordination with operating the tiltable reflector, such that the second light beam has brightness corresponding to the second pixel.

* * * * *